(12) United States Patent
Lee (10) Patent No.: US 8,347,394 B1
(45) Date of Patent: Jan. 1, 2013

(54) DETECTION OF DOWNLOADED MALWARE USING DNS INFORMATION

(75) Inventor: Andrew Lee, Mountain View, CA (US)

(73) Assignee: Trend Micro, Inc., Tokyo (JP)

( * ) Notice: Subject to any disclaimer, the term of this patent is extended or adjusted under 35 U.S.C. 154(b) by 629 days.

(21) Appl. No.: 12/503,253

(22) Filed: Jul. 15, 2009

(51) Int. Cl.
*G08B 23/00* (2006.01)

(52) U.S. Cl. ............ 726/25; 726/22; 726/23; 726/24

(58) Field of Classification Search ........... 726/22–25
See application file for complete search history.

(56) References Cited

U.S. PATENT DOCUMENTS

| | | | | |
|---|---|---|---|---|
| 7,747,780 B2* | 6/2010 | Perry et al. | | 709/245 |
| 7,849,502 B1* | 12/2010 | Bloch et al. | | 726/11 |
| 7,854,007 B2* | 12/2010 | Sprosts et al. | | 726/24 |
| 7,926,108 B2* | 4/2011 | Rand et al. | | 726/22 |
| 7,984,186 B2* | 7/2011 | Perry et al. | | 709/245 |
| 8,015,139 B2* | 9/2011 | Bahl et al. | | 706/46 |
| 2006/0212925 A1* | 9/2006 | Shull et al. | | 726/1 |
| 2006/0212930 A1* | 9/2006 | Shull et al. | | 726/10 |
| 2008/0028443 A1* | 1/2008 | Adelman et al. | | 726/4 |
| 2009/0210935 A1* | 8/2009 | Miley et al. | | 726/7 |
| 2010/0057895 A1* | 3/2010 | Huang | | 709/222 |

OTHER PUBLICATIONS

Caglayan, A.; Toothaker, M.; Drapeau, D.; Burke, D.; Eaton, G.; , "Real-Time Detection of Fast Flux Service Networks," Conference for Homeland Security, 2009. Catch '09. Cybersecurity Applications & Technology , vol., No., pp. 285-292, Mar. 3-4, 2009.*

* cited by examiner

*Primary Examiner* — Edward Zee
*Assistant Examiner* — Thomas Gyorfi
(74) *Attorney, Agent, or Firm* — Beyer Law Group LLP (57) ABSTRACT

A DNS engine monitors domain name system (DNS) network activity occurring between a user computer and a remote computer server. The engine collects DNS traffic information during a specified time window at the user computer using the monitored DNS network activity. The engine generates a local DNS reputation for the user computer and stores the local DNS reputation on the user computer. When a triggering event is received at the user computer the engine determines that the triggering event is abnormal in comparison to the stored local DNS reputation. An alert is issued to a software product on the user computer. The engine takes an action using a software product upon the alert. The reputation may be a frequency distribution for each accessed domain name and IP address. A triggering event may be an abnormal access to a domain name or IP address, or a mismatch between DNS queries and DNS responses of the user computer.

27 Claims, 4 Drawing Sheets

| FIELD | DESCRIPTION | LENGTH |
|---|---|---|
| NAME | NAME OF NODE | VARIABLE |
| TYPE | TYPE OF RECORD | 2 |
| CLASS | CLASS CODE | 2 |
| TTL | TIME IN SECONDS | 4 |
| RD LENGTH | LENGTH OF FIELD | 2 |
| R DATA | RECORD DATA | VARIABLE |

RESOURCE RECORD FIELDS

DETECTION OF DOWNLOADED MALWARE USING DNS INFORMATION

FIELD OF THE INVENTION

The present invention relates generally to detection of malware on a computer. More specifically, the present invention relates to the detection of malware that has been downloaded onto a computer using DNS traffic information.

BACKGROUND OF THE INVENTION

Currently, undesirable software such as computer viruses, worms, spyware, etc. (generally, malware) affect a great many computers daily and efforts are constantly under way to prevent, detect and remove such malware. One current detection technique is to scan files on a computer using antivirus software that can detect known computer viruses. Existing viruses are analyzed in a laboratory, and these samples produce a unique virus pattern, or virus signature, that is then used by the antivirus software to detect the known computer viruses on a computer. One drawback with this technique is that samples of viruses are required in order to detect future infections.

An improvement upon this technique extracts any URLs present in the computer virus and then the antivirus software (or similar software) is able to block traffic associated with this URL. It is assumed that a URL within the malware, or the URL from where the malware originated (by e-mail, file transfer, Internet download, etc.) is a malicious URL. Again, this improvement requires samples of existing computer viruses or other malware.

For new malware, i.e., malware that affects computers for the first time and has not been seen or analyzed before (also referred to as a zero-day attack), it can be more difficult to prevent and detect such malware. Domain parking and inexpensive registered domain names can make detection more difficult. As known in the art, domain parking is a process where one registers a domain but does not enter the domain name servers of the hosting company. A domain parking service hosts the domain and offers the owner revenue from the parked domain when a user clicks upon it. It can be difficult for a backend anti-malware service to detect and block malware in real time coming from these parked domains or from inexpensive registered domains because one cannot predict which domains will be registered and assigned to serve as malicious URLs. Further, one is not able to retrieve a full list of all fully-qualified domain names from the registrars. Thus, the backend service cannot see these domain names until they are revealed to the users, and, when revealed, this means that someone has already been infected and the infection has started to spread.

In other words, anti-malware software can predict malware threats and can block such threats based upon previous samples of malware and known malicious URLs, but can find it difficult to detect and block zero-day malware and malware from URLs that have not been identified as malicious. A technique to detect such malware would be desirable.

SUMMARY OF THE INVENTION

To achieve the foregoing, and in accordance with the purpose of the present invention, a malware detection system is disclosed that detects downloading of malware and malware activity on the computer using a local DNS reputation.

In one embodiment, a DNS engine monitors domain name system (DNS) network activity occurring between a user computer and a remote computer server. The engine collects DNS traffic information during a specified time window at the user computer using the monitored DNS network activity. The engine then generates a local DNS reputation for the user computer and stores the local DNS reputation on the user computer. When a triggering event is received at the user computer the engine determines that the triggering event is abnormal in comparison to the stored local DNS reputation. An alert is issued to a software product on the user computer.

In another embodiment, the DNS engine takes an action using a software product upon the alert, the software product being an operating system of said user computer, an antivirus product installed on said user computer, or a software module of said user computer.

One advantage of the present invention is its ability to detect new malware and identify new malware samples for analysis, as well as threat prevention of such malware. Another advantage is that the present invention reduces the cost of analyzing collected DNS information offline in a backend service; the invention pushes the cost to a client or host computer through use of a lightweight DNS engine.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how it executes, how it spreads or what it does. Commercially available so-called "anti-virus" software is designed to scan a computer for many types of malware, not only computer viruses. Of course, later developed software not currently known may also fall within the definition of malware. As used herein, the term malware includes viruses, worms, Trojans, backdoors, exploits, keyloggers, botware, grayware, spyware, and other undesirable software.

As explained earlier, it would be desirable to detect new malware or malware variants without needing to analyze samples of such malware beforehand. The inventive technique used herein realizes that downloaded malware must come from a particular location, and that DNS reputation information may be accumulated at the end-user computer and used to detect when such malware is being downloaded. Malware may be inadvertently (or purposefully), downloaded via a standard downloading program of an operating system, via malware such as a Trojan, or via any suspicious process.

As is known in the art, the Domain Name System (DNS) is a hierarchical naming system for computers connected to the Internet. The DNS associates various information with domain names assigned to participants. The DNS translates domain names meaningful to humans into the numerical (binary) identifiers associated with networking equipment for the purpose of locating and addressing devices world-wide. In other words, the Domain Name System operates as a "telephone book" for the Internet by translating human-friendly computer host names into IP addresses. For example, www.sample.com might translate to 218.88.333.156.

A name server is basically a computer server used to implement the Domain Name System. The DNS is maintained by a distributed database system, which uses the client-server model, and the nodes of this database are the name servers. Each domain has one or more authoritative DNS name servers that publish information about that domain and the name servers of any domains subordinate to it. The top of the hierarchy is served by the root name servers, i.e., the servers to query when looking up (i.e., resolving) a top-level domain name.

Invention Overview

In one embodiment, the present invention uses a special DNS engine software module installed upon a client end-user computer to collect information and to detect malware. The DNS engine collects authentic DNS traffic information (associated with computer network activity) such as domain name servers, mail servers, IP addresses, and other DNS records. This information collected at the end-user computer is correlated with a base trained model if available or an empty model as default in order to generate a local DNS reputation to detect new malware that might be downloaded via a downloading program, malware (such as a Trojan) or any suspicious process.

The DNS engine is triggered by some event such as by an attempt to access a domain name. For example, if a suspicious process downloads new binary files (using any technique such as an IP address, a specified URL, or NetBIOS), this event indicates suspicious behavior. The DNS engine will be triggered to collect and resolve DNS records from trusted sources, to correlate information and to provide feedback.

Block Diagram

Figure 1:
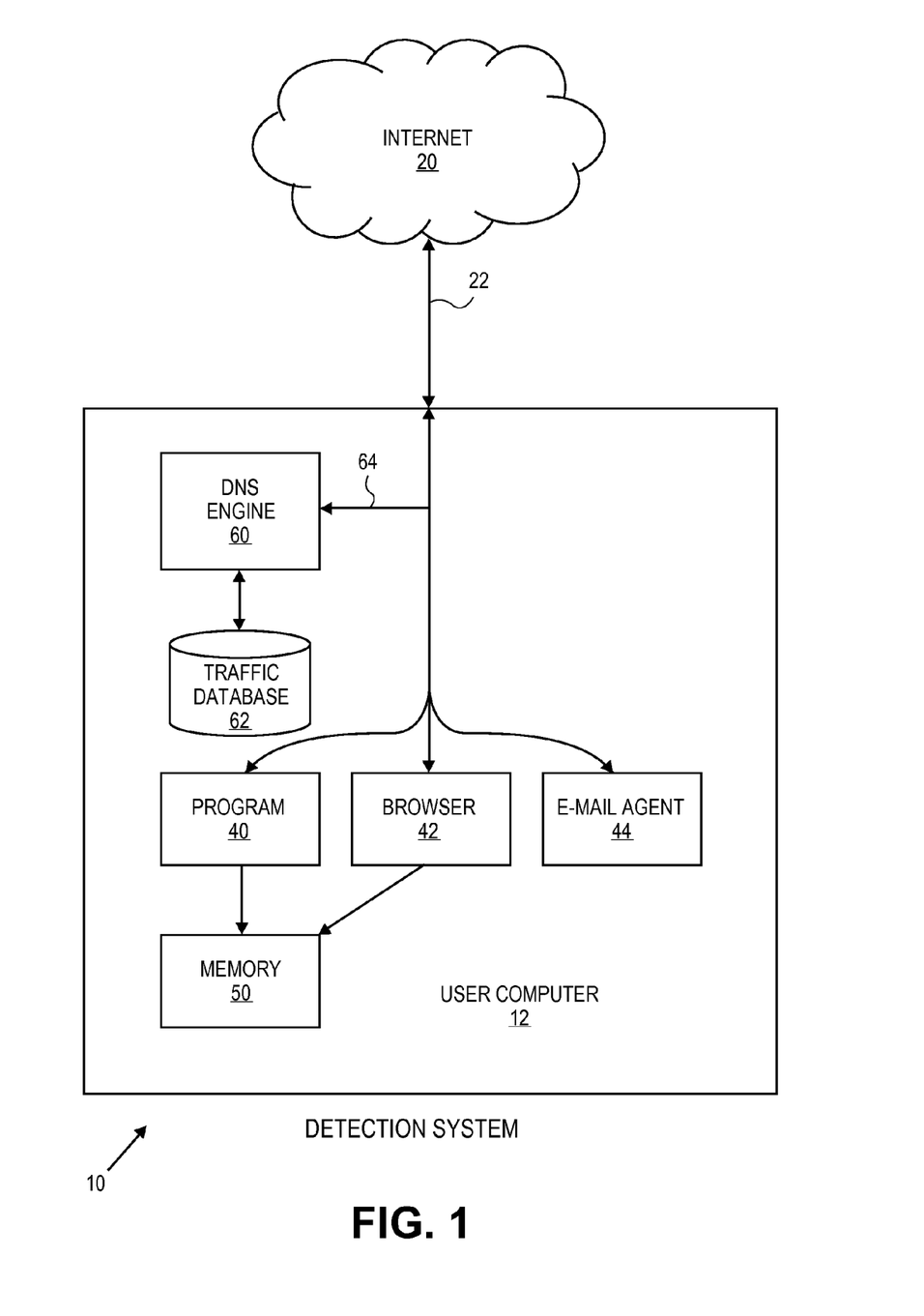
FIG. 1 is a block diagram of a detection system for detecting malware downloaded over the Internet.

FIG. 1 is a block diagram of a detection system 10 for detecting malware downloaded over the Internet. As shown, a user computer 12 is connected to the Internet 20 over any suitable type of network connection 22 and includes a variety of computer programs such as program 40, browser 42 and e-mail agent 44. These programs may write to a memory 50 of the computer. Also included is a DNS engine software module 60 according to the present invention that monitors DNS traffic via a link 64. The engine stores DNS traffic information into a database 62. The DNS engine may also store the information in a data storage in memory.

As is known in the art, computer 12 using suitable hardware and software may initiate a network connection 22 via a DNS query to the Internet; an outside entity then responds with an appropriate response. In one embodiment of the invention, computer 12 is an end-user computer utilized by a person for Internet activity, data processing, word processing, etc. Computer 12 may be one of many user computers within an enterprise that utilize enterprise computing infrastructure (such as e-mail servers, proxy servers, a firewall, etc.) to perform activities over the Internet. In any case, requests from computer 12 will eventually be sent out over the Internet, and responses from the Internet will arrive at computer 12. DNS engine 60 is preferably installed on each user computer within the local network and provides the capability to detect downloaded malware and to alert each computer when malware is detected. DNS engine 60 is preferably written in a language such as C and assembly.

A variety of software programs on computer 12 may send requests out over the Internet for information, may download programs from the Internet, may send electronic messages to other computers on the Internet, etc. In general, any program that initiates a network connection, such as by sending out a DNS query, may have the resulting DNS traffic monitored by DNS engine 60. For example, program 40 is any suitable application, program or code that accesses the Internet to download software or to retrieve information (including instant messaging applications, chat applications, video applications or malware). Browser 42 is any suitable Internet browser that sends out DNS queries or downloads software (such as Apple Safari, Mozilla Firefox or Internet Explorer). E-mail agent 44 is any suitable e-mail program or mail transfer agent that sends e-mail messages or receive e-mail messages over the Internet.

DNS engine 60 is a software module that passively monitors and records via link 64 all DNS traffic between computer 12 and the Internet. A variety of techniques may be used by engine 60 to monitor the DNS traffic over connection 22. In one embodiment, engine 60 operates as a DNS sniffer to monitor all packets. For example, the tool WinPcap may be used. WinPcap is an industry-standard software tool for link-layer network access in Microsoft operating systems; it allows applications to capture and transmit network packets bypassing the protocol stack. Examples of applications using WinPcap that may also be used include "WireShark" and "Ethereal." In addition, custom code may be written to perform the sniffing application. For example, custom code may be written to insert software hooks into the operating system kernel to monitor network drivers at a very low level. In general, network packets may be captured at all levels ranging from the kernel level up to the user level. Engine 60 may be configured to monitor only one port of a computer (e.g., Port 53) or may monitor all ports. Preferably, DNS engine 60 is installed fresh on a computer that is free of malware. The engine is then able to make the assumption that the computer is not affected by malware.

It can be important that the computer is not affected by malware when the engine is installed. With a fresh installment, there is a better chance of creating a clean fingerprint of the clean system DNS traffic model. Otherwise, the ability to detect suspicious/malicious domains and IP addresses will degrade because of the infected DNS traffic mingled with the normal traffic that occurs later.

Flow Diagram

Figure 2:
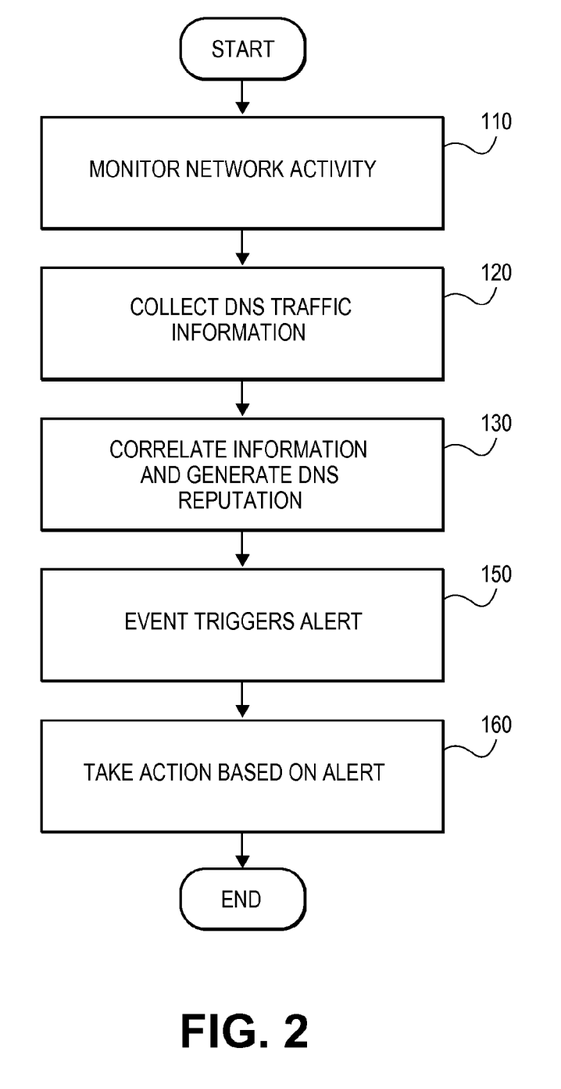
FIG. 2 is a flow diagram describing one embodiment for detecting malware.

FIG. 2 is a flow diagram describing one embodiment for detecting malware. In step 110 user computer 12 performs network activity over connection 22 and it is this activity which is monitored. The activity may be initiated by any user action such as use of an Internet browser, an instant messaging program, e-mail access, an FTP transfer, etc. In addition, any legitimate program on the computer may generate network activity even without the user's knowledge, and, malware may generate activity without the user's permission. In general, any activity attempting to resolve a domain name to an IP address resulting in a DNS query will cause DNS traffic information to be monitored. For example, the operating system, an application or any API may initiate DNS traffic. Sending and receiving e-mail messages also generates DNS traffic information. When e-mail is received, the mail user agent (MUA) may need to submit a DNS query in order to resolve an e-mail domain name. Or, when e-mail is sent, the MUA needs to resolve the domain name from the e-mail address in order to determine the remote e-mail server.

In one embodiment, DNS engine 16 monitors (or sniffs) the UDP packet that includes the DNS packet information. Typically, all DNS queries consist of a single UDP request from the client followed by a single UDP reply from the server. The DNS packet includes a resource record as described below with reference to FIG. 3. Generally then, network activity in step 110 includes DNS traffic information from a remote DNS name server.

In step 120 the DNS engine collects a variety of information from the DNS traffic, including from the resource record. In one embodiment, traffic information is collected during a particular time frame (such as one day, three days, one week, etc.) and this time frame may be a sliding window. For example, if the time frame is one day, information may be collected for 24 hours and then after each subsequent hour of data collection, the earliest hour of data collection is removed such that only 24 hours of data is kept at a time. Alternatively, data collection may be continuous and no data is ever deleted or removed, but analysis of traffic information only occurs for the specified time window, e.g., the last day, the last three days, etc.

DNS traffic information collected includes: the domain name from a DNS query; the IP address to which the domain name is mapped; the DNS name servers responsible for that domain name (whether authoritative or non-authoritative); the IP addresses of these name servers; the number of DNS queries or requests sent from the user computer out over a local area network or over the Internet; the number of DNS responses coming back to the user computer; and basically anything in the DNS packet found to be useful. As a domain name may be mapped to many different IP addresses (included within the resource record), these different IP addresses corresponding to a single domain name are also collected. In one specific embodiments, collection focuses on the A type, NS type, MX type or CNMAE type resource records.

Part of the collection process keeps track of the frequency with which each domain name is queried within the specified time frame. Also, the frequency with which a particular IP address is accessed is also collected. If a domain name maps to five IP addresses this counts as five occurrences of the domain name and one occurrence for each IP address. For example, the data structure collects both: <domain, frequency> and <IP, frequency>. Preferably, the system keeps track of the fact that a domain name maps to a particular IP address since we are looking at RR records that are sent and received on the same machine. A complete DNS "send and receive" will construct a mapping using the domain name and IP addresses.

In step 130 the DNS engine correlates the collected information and generates a DNS reputation for each domain name. In this fashion, a local reputation is developed based upon the Internet activity of the user and his or her computer. In one embodiment, a distribution is generated for each domain name queried by the computer during the time frame, and this distribution then becomes the local reputation for that domain name. The distribution represents the user's DNS traffic pattern for a particular domain.

For example, if a particular domain name is resolved to 5 different IP addresses, and each of these IP addresses is accessed on average 200 times over a one week period, then that information forms the basis of the local reputation for that domain name for the user computer. In other words, the reputation of that domain name is that it is typical that these IP addresses will be accessed frequently over a one week period. But, if a sixth IP address is resolved from that domain name very rarely, then that event can trigger an alert as described below.

Figure 4:
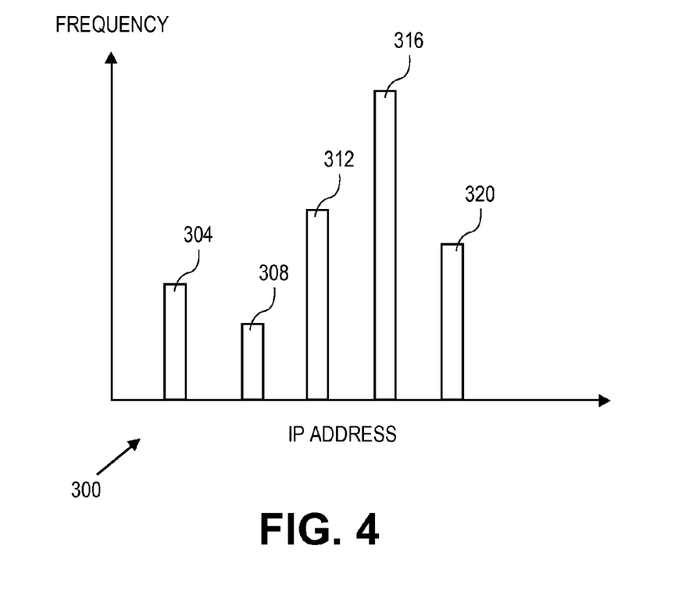
FIG. 4 illustrates a graph showing frequency of IP address access for a given domain name during a particular time frame.

The information collected may be stored or represented in graphical form as well. For example, FIG. 4 illustrates a graph 300 showing frequency of IP address access for a given domain name during a particular time frame. In this example, each of the IP addresses 304-320 were accessed during a particular time window (e.g., during a one-week period) based upon resolution of a particular domain name. From this data, various statistics may be derived such as average, mean, standard deviation, etc. The statistics indicates how frequently a particular IP address is accessed for a given domain name, what is the average frequency of accessing a particular IP address from a given domain name, etc.

In step 150 an event occurs that may trigger the DNS engine to issue an alert. For example, if a domain name resolves to a new IP address that has not been used by the computer before, then an alert may occur because this new IP address is suspicious. Of course, the first time that any new IP address is used on the computer will trigger an alert. A determination that an IP address is a new IP address can be made by reference to the DNS reputation data previously generated (i.e., if the IP address does not appear in any of the graphs corresponding to FIG. 4 then it is considered a new IP address). An alert may also occur if an IP address is accessed during the specified time frame with an abnormally low or an abnormally high frequency. For example, if the average of the graph of FIG. 4 indicates that each IP address for a particular domain name is accessed on average 30 times per week, but a new IP address for that domain name is accessed only 5 times per week or more than 50 times per week, then that change in frequency will trigger an alert. Alternatively, if an IP address appears that is not on a white list of IP addresses for that computer then an alert may be triggered. Not appearing on a white list mail may be required to be combined with a new IP address or an abnormal frequency of an IP address in order to trigger an alert.

Another trigger depends upon the DNS request and response numbers. For example, a mismatch between the number of DNS requests sent from the computer and the number of responses received from the Internet or over a local area network (within the specified time frame) will trigger an alert. If the difference between the two numbers is greater than a certain number (e.g., a threshold such as the average value or the mean value derived from another domain) then an alert is triggered. More specifically, a global threshold value is derived from all domain requests and response counts, collected locally per DNS per domain, and then counted globally for all domains collected). In general, any abnormal DNS activity (compared to the past DNS activity during the time frame) may trigger an alert. Frequency of access of a particular IP address should fit the normal distribution that has been generated for that domain name during that timeframe.

In step 160 a suitable software product receives the alert from the DNS engine and takes appropriate action. For example, any of a variety of antivirus or anti-malware software products may use the DNS engine to trigger alerts. The alert may also be sent to the user computer (in addition to or instead of to the software product) in which case it may appear as an e-mail message, pop-up window, or other indication to the user that an alert has been triggered. The alert may also be received by the operating system of the computer.

Depending upon the policies implemented by the software product that uses the DNS engine, the action taken may include: resolving an unknown or suspicious IP address to a frequently used or suspected safe IP address; dropping a suspicious IP address and performing another DNS query to a different name server; blocking the requested web page from loading; blocking the IP address; dropping the requested packets; stopping the program (suspected of being malware) that has sent the request from sending more requests; terminating the program that has attempted to access the suspicious IP address; sending a new DNS query over a secure channel (to prevent a middleman attack) to a different remote DNS server; spoofing the DNS response with a local IP address to prevent Internet access until the IP address is verified with the secure channel (i.e., postponing Internet access); and triggering a behavior analysis module to monitor future activities of such application. Alternatively, the DNS engine may be configured to take the appropriate action on its own.

Figure 3:
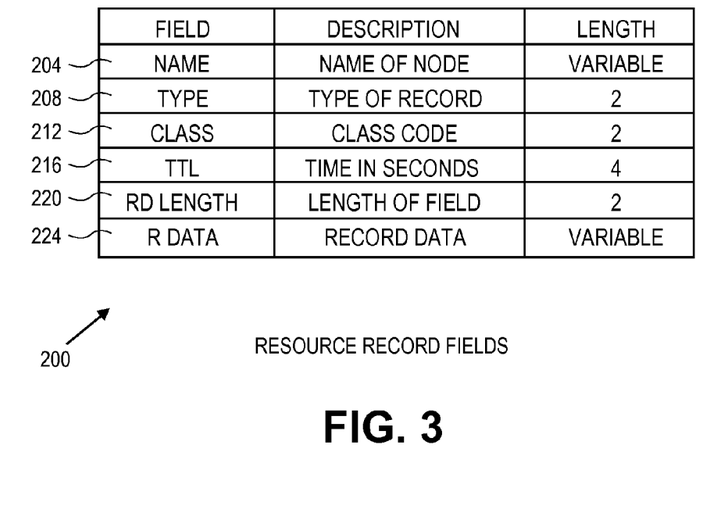
FIG. 3 is illustrates the typical fields in a DNS resource record.

FIG. 3 illustrates the typical fields in a DNS resource record 200. As known in the art, a resource record is the basic data element of the domain name system, and each record has a type and information corresponding to that type. All resource records of the same type define a resource record set. When sent over the Internet, these records use the common format shown in FIG. 3.

Name field 204 is the fully qualified domain name of the node in the tree. The name may be shortened. Type field 208 is the type of record, indicates the format of the data, and hints at the intended use of the record. An A record type is used to translate from a domain name to an IPv4 address and its data field 224 is the actual IP address. An NS record type lists which name servers can answer lookups in a DNS zone; its data field 224 is also an IPv4 address of the name servers in the additional section if available, otherwise, another DNS query of A record type will be sent to look up the domain name of the name server.

An MX record type is used to translate from a name in the right hand side of e-mail address to the name of the machine able to handle e-mail for that address, and its data field 224 is the e-mail host. A TXT record type is used to extend the feature for DNS (and other definitions such as RFC 4408) to support SPF in TXT records; its data field is text in ASCII. A PTR record type is used look up the domain name of the IP address and its data field is the domain name of the IP address. An SOA record type is used to identify the best source of information for the data within this DNS domain. Its data field includes: source host (where the host file is created); contact e-mail if available; a serial number that is published as a unique identifier for the current host information; and, an expire time (TTL) when the record may expire.

Class field 212 is typically always set to "IN" or "Internet." TTL field 216 (time to live) is the time in seconds (signed) that the resource record will stay valid. Length field 220 is the length of the data field, and data field 224 is the specific data for the record type as described above.

Computer System Embodiment

Figure 5A:
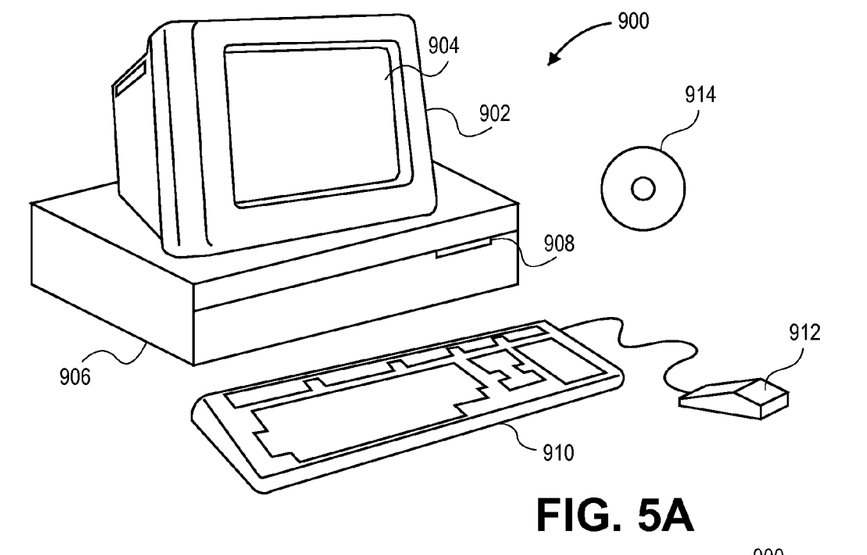
FIGS. 5A and 5B illustrate a computer system suitable for implementing embodiments of the present invention.
Figure 5B:
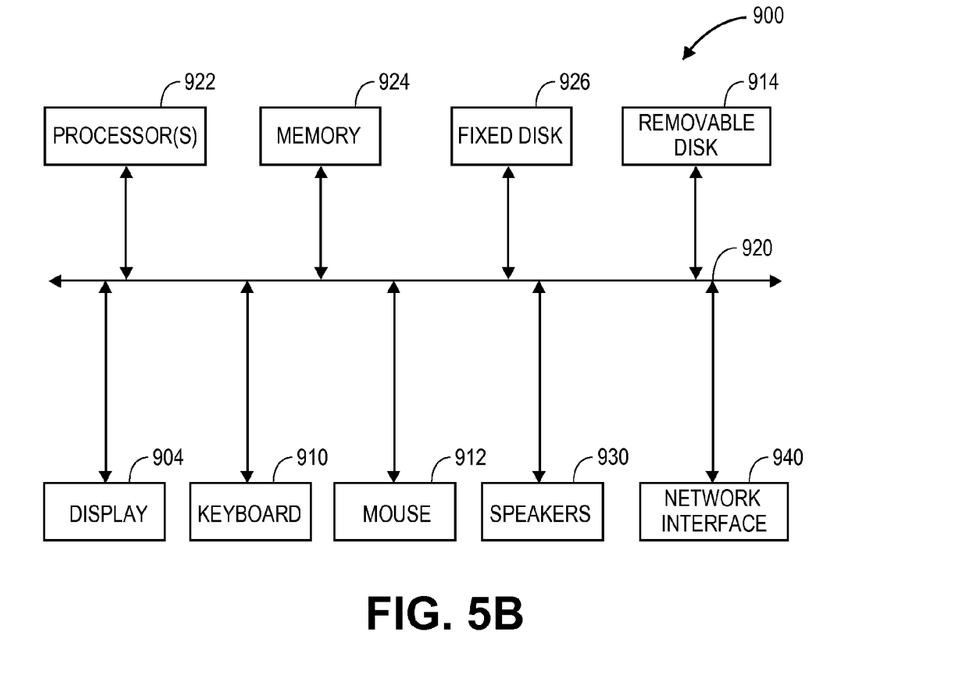

FIGS. 5A and 5B illustrate a computer system 900 suitable for implementing embodiments of the present invention. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting malware, said method comprising:
    monitoring domain name system (DNS) network activity occurring between a user computer and a remote computer server, said monitoring occurring at said user computer;
    collecting DNS traffic information during a specified time window at said user computer using said monitored DNS network activity;
    generating, by said user computer, a local DNS reputation of said user computer from said DNS traffic information and storing said local DNS reputation on said user computer;
    receiving a triggering event at said user computer;
    determining that said triggering event is abnormal in comparison to said stored local DNS reputation; and
    issuing an alert to a software product on said user computer.

2. A method as recited in claim 1 further comprising:
    collecting DNS traffic information from resource records of DNS packets.

3. A method as recited in claim 2 wherein said collected DNS traffic information includes queries of domain names.

4. A method as recited in claim 2 wherein said collected DNS traffic information includes IP addresses that have been resolved from domain name queries.

5. A method as recited in claim 2 wherein said collected DNS traffic information includes the number of DNS queries from said user computer and the number of responses to said user computer from the domain name system.

6. A method as recited in claim 2 wherein said collected DNS traffic information includes for each domain name queried by said user computer, a list of corresponding IP addresses, and the number of times each IP address is accessed.

7. A method as recited in claim 1 wherein said software product is an operating system of said user computer, an antivirus product installed on said user computer, or a software module of said user computer.

8. A method as recited in claim 1 wherein generating a local DNS reputation includes
    generating a frequency distribution for each domain name indicating the frequency of access to particular IP addresses.

9. A method as recited in claim 1 further comprising:
    taking an action by said software product when said alert is received.

10. A method as recited in claim 1 wherein said user computer is an end-user computer.

11. A method as recited in claim 1 wherein said local DNS reputation is based upon Internet activity of said user computer.

12. A method as recited in claim 1 wherein said remote computer server is a remote DNS computer server.

13. A method as recited in claim 1 wherein said remote computer server is a remote DNS computer server.

14. A method as recited in claim 1 wherein said remote computer server is a remote DNS computer server.

15. A method as recited in claim 1 wherein said local DNS reputation includes a DNS traffic pattern of said user computer for a particular domain.

16. A method of detecting malware, said method comprising:
    monitoring domain name system (DNS) network activity occurring between an end-user computer and a remote computer server, said monitoring occurring at said end-user computer;
    collecting DNS traffic information during a specified time window at said end-user computer using said monitored DNS network activity;
    generating, by said end-user computer, a local DNS reputation of said end-user computer with respect to a domain name accessed by said end-user computer from said DNS traffic information and storing said local DNS reputation on said end-user computer in a database;
    receiving a triggering event at said end-user computer, said triggering event involving accessing said domain name;
    determining that said triggering event is abnormal in comparison to said stored local DNS reputation; and
    taking an action to prevent access to said domain name by said end-user computer when said determination is made.

17. A method as recited in claim 16 wherein said triggering event is accessing an IP address with a lower frequency when compared to said DNS reputation or accessing an IP address with a higher frequency when compared to said DNS reputation.

18. A method as recited in claim 16 wherein said triggering event is a mismatch between the number of DNS requests send from said end-user computer and the number of DNS responses received.

19. A method as recited in claim 16 wherein said collected DNS traffic information includes for each domain name queried by said end-user computer, a list of corresponding IP addresses, and the number of times each IP address is accessed.

20. A method as recited in claim 16 further comprising:
    taking said action using a software product, wherein said software product is an operating system of said end-user computer, an antivirus product installed on said end-user computer, or a software module of said end-user computer.

21. A method as recited in claim 16 wherein generating a local DNS reputation includes
    generating a frequency distribution for each domain name indicating the frequency of access to particular IP addresses.

22. A method as recited in claim 16 wherein said local DNS reputation is based upon Internet activity of said end-user computer.

23. A method of preventing malware from accessing an end-user computer, said method comprising:
    monitoring domain name system (DNS) network activity occurring between said end-user computer and a remote computer server, said monitoring occurring at said end-user computer;
    collecting domain names queried by said end-user computer and collecting IP addresses that have been resolved from said domain name queries, said collecting occurring during a specified time window at said end-user computer;
    generating, by said end-user computer, frequency of access data for each of said domain names and said IP addresses accessed by said end-user computer and storing said frequency of access data on said end-user computer;
    receiving a triggering event at said end-user computer;
    determining that said triggering event is abnormal in comparison to said stored frequency of access data; and taking an action to prevent access to one of said domain names or to one of said IP addresses by said end-user computer when said determination is made.

24. A method as recited in claim 23 further comprising:
collecting the number of DNS queries from said end-user computer and the number of DNS responses to said end-user computer from the domain name system.

25. A method as recited in claim 24 further comprising:
determining that said triggering event is a mismatch between said DNS queries and said DNS responses.

26. A method as recited in claim 23 wherein said collected domain names includes for each domain name queried by said end-user computer, a list of corresponding IP addresses, and the number of times each IP address is accessed.

27. A method as recited in claim 23 wherein said domain name to which access is prevented is unknown to any anti-malware software on said end-user computer.

* * * * *